United States Patent [19]

Wojtasinski et al.

[11] 3,889,185
[45] June 10, 1975

[54] LIGHTNING CURRENT MEASURING SYSTEMS

[75] Inventors: Ronald J. Wojtasinski, Cocoa Beach; James H. Jones, Titusville; Raymond V. Lisle, Indialantic, all of Fla.

[73] Assignee: The United States of America as represented by the United States National Aeronautics and Space Administration, Office of General Counsel-Code GP, Washington, D.C.

[22] Filed: Apr. 15, 1974

[21] Appl. No.: 461,073

[52] U.S. Cl. ............................................. 324/72
[51] Int. Cl. ...................................... G01r 31/02
[58] Field of Search .............. 324/72, 76, 72.5, 119, 324/149

[56] References Cited
UNITED STATES PATENTS

| | | |
|---|---|---|
| 3,684,955 | 8/1972 | Adams ................................ 324/72 |
| 3,715,660 | 2/1973 | Ruhnke ............................... 324/72 |
| 3,760,268 | 9/1973 | Ruhnke ............................... 324/72 |

*Primary Examiner*—Alfred E. Smith
*Assistant Examiner*—Michael J. Tokar
*Attorney, Agent, or Firm*—James O. Harrell; John R. Manning

[57] ABSTRACT

An apparatus for monitoring and analyzing electrical currents produced by lightning strikes. The apparatus includes an electrical conductive mast having a first circuit coupled thereto for generating a DC voltage proportional to a peak current generated in the mast by each lightning strike. A second circuit is coupled to the mast for generating a digital signal representative of the wave shape of the current generated in the mast by each lightning strike and a third circuit is provided closely adjacent the mast for producing a reference voltage. Signals are fed into a strip chart recorder making a permanent record of the current produced by the lightning strike.

4 Claims, 1 Drawing Figure

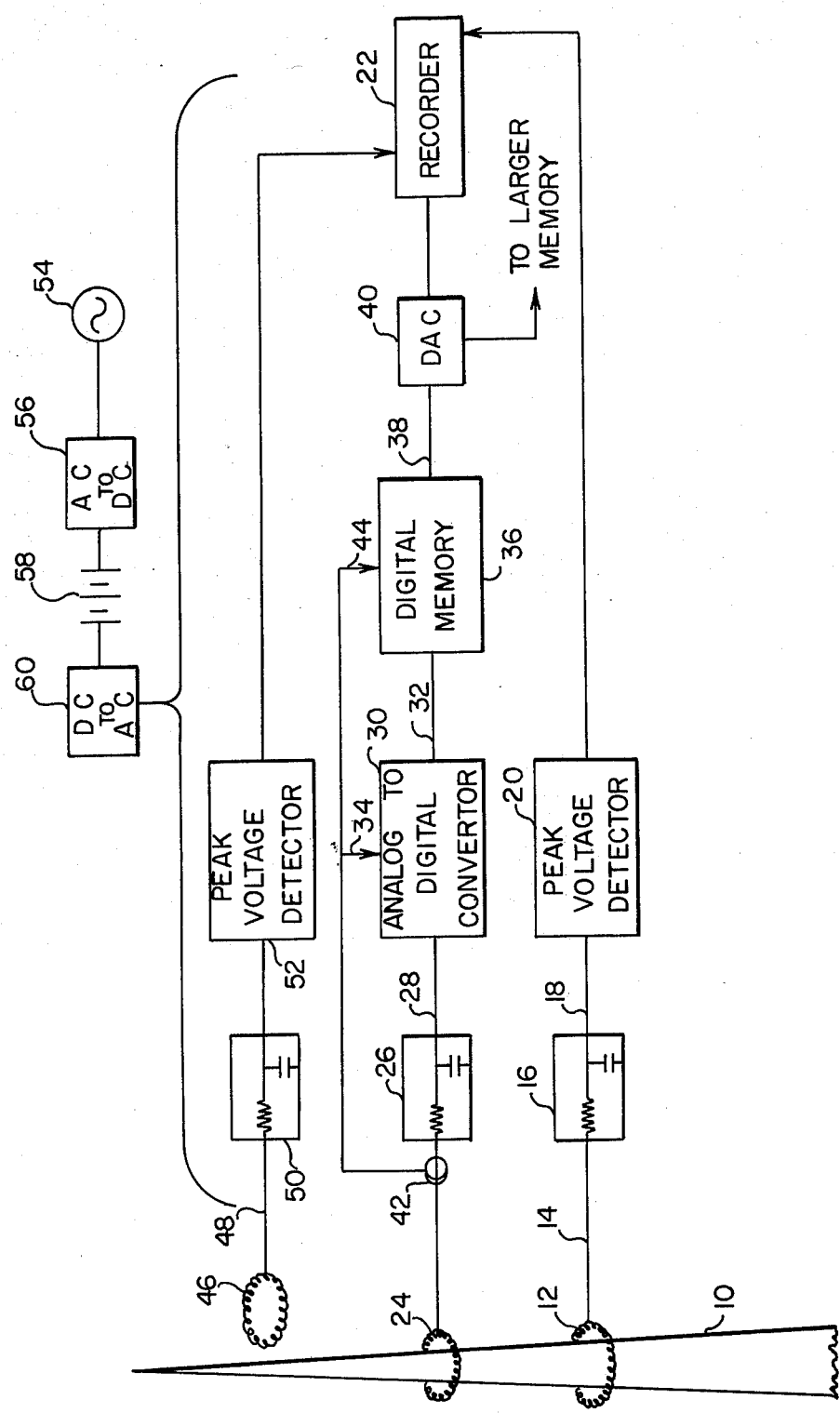

LIGHTNING CURRENT MEASURING SYSTEMS

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

This invention relates generally to an apparatus for monitoring electrical currents and more particularly to an apparatus for monitoring electrical currents produced by lightning.

The increased use of solid state electronics and their inherent sensitivity to over voltage breakdowns has required more quantitative methods of determining the number of strokes and characteristics of lightning currents in launch vehicles support structures. When launching space vehicles, it is important to know that none of the components contained therein have been damaged by lightning while on the launch pad waiting to be launched. It is important to know the intensity of the lightning strike immediately after such occurs and prior to launch so as to determine the probability of the current produced by the lightning strike adversely affecting the components of the space vehicle.

Measurement of lightning currents are extremely difficult because of the large currents and the high electric and magnetic fields produced during the lightning strike interacts with and introduces large errors in the measured characteristics of the lightning current. Because the lightning is transitory and predictable, conventional recording techniques are not adequate. The techniques and devices heretofore utilized for measuring lightning currents incorporated the use of magnetic links, current shunts, and current transformer sensing devices. The electrical output of the latter two were displayed on an oscillograph and photographed. Also peak reading voltmeters were utilized for holding the highest induced peak voltage produced by the lightning strike. These systems were used singularly and required manual operation to set trigger levels, reset trigger levels, and to operate the photographic equipment. The magnetic link method required recovering a magnetized ferrous slug from a lightning rod and have such analyzed in a laboratory to determine the peak current produced by the current.

SUMMARY OF THE INVENTION

The invention includes an apparatus for monitoring and analyzing electrical currents produced by lightning strikes. The apparatus includes an electrically conductive mast which has currents produced therein responsive to lightning strikes. A first circuit means is coupled to the mast for generating a DC voltage proportional to a peak current generated in the mast by each lightning strike. The first circuit includes a first coil encircling the mast for sensing the flux change produced by current flowing through the mast which is caused by a lightning strike and for generating a voltage responsive thereto. An integrator is coupled to the first coil for generating an integrated voltage proportional to the flux change sensed by the first coil. A peak voltage detector is coupled to the integrator for generating a voltage having an amplitude proportional to the peak of the integrated voltage. A second circuit means is coupled to the mast for generating a digital signal representative of the wave shape of the current generated in the mast by each lightning strike. The second circuit includes a second coil encircling the mast for sensing the flux change produced by the current flowing through the mast caused by a lightning strike and generating a voltage responsive thereto. The second integrator is coupled to the second coil for generating an integrated voltage directly proportional to the amplitude of the current flowing in the lightning mast. An analog-to-digital convertor is coupled to the second integrator for sampling the integrated signal at a predetermined rate and generating digital signals corresponding to the integrated voltage. Means is provided for recording the voltage generated by the first circuit and the digital signals produced by the second signal for producing a record representing the wave shape of the current produced in the mast by the lightning strike and the peak current produced therein.

Accordingly, it is the general object of the present invention to provide an apparatus for determining the magnitude and wave shape of current produced by a lightning strike in a mast mounted in the vicinity wherein it is desired to monitor lightning strikes.

Another important object of the present invention is to provide a relatively simple and reliable apparatus for measuring the maximum current produced by a lightning strike.

Still another important object of the present invention is to provide a simple and reliable apparatus which produces in digital form a wave shape corresponding to a current wave shape produced by lightning.

These and other object and advantages of the invention will become apparent upon reference to the following specification attendant claims and drawing.

BRIEF DESCRIPTION OF THE DRAWING

FIG. 1 is a schematic diagram of an apparatus utilized for monitoring currents produced by a lightning strike.

DESCRIPTION OF THE PREFERRED EMBODIMENT

Referring in more detail to the drawing, there is illustrated a schematic diagram of a circuit utilized for monitoring and analyzing the characteristics of currents produced by lightning flashes. In analyzing the lightning flashes, it is desirable to determine the peak current generated by the lightning flash in a lightning mast generally designated by the reference 10 carried on top of a structure such as a tower. It is also desirable to have a reference voltage detecting circuit so as to generate a signal against which the voltage generated by a peak current generating circuit and a current wave shape circuit can be compared so as to avoid errors possibly being produced in cables and the like from electric fields produced by the lightning strike.

The mast 10 in one particular embodiment is a copper plated steel rod which is electrically conductive. The mast 10 is mounted on top of a tower, for example, where a missile is being launched so as to sense any current generated by lightning strikes in the vicinity. In order to measure the peak current generated by the lightning strike in the mast 10, a first toroidal coil 12 is mounted on the mast 10 encircling such. The purpose of the coil 12 is to sense any flux changes created by current flowing through the mast that was, in turn, generated by the lightning strike. The flux change detected by the coil 12 causes a voltage to be produced therein which is fed over a shielded cable 14 to a first integrating circuit 16. The integrating circuit 16 integrates the incoming voltage and produces an integrated voltage wave form on an output lead 18. The integrated voltage is fed into a peak voltage detector 20 which produces a voltage on its output having an amplitude corresponding to the maximum current produced by the lightning strike in the mast 10. The output of the peak voltage detector 20 which is a conventional item is then fed to a strip chart recorder 22 which makes a permanent record of the voltage. By viewing the graph of the voltage recorded on the recorder 22, variation in current produced by the lightning strike in the mast 10 can be determined.

A second circuit is coupled to the mast 10 for generating a digital signal representing the wave shape of the current produced in the mast 10 by the lightning strike. The second circuit includes a toroidal coil 24 which encircles that mast 10. The coil 24 senses change in flux produced by current flowing through the mast 10 and generating a voltage proportional thereto. The voltage is fed to an integrator 26 which integrates the signals and produces an integrated voltage wave form on output lead 28. The output lead 28 is, in turn, coupled to an analog-to-digital converter 30 which samples the integrated signal appearing on lead 22 at predetermined intervals converting such samples to digital signals on output lead 32. The analog-to-digital convertor may be any suitable analog-to-digital convertor that is adapted to be triggered off after a predetermined period of time after a trigger pulse is received on lead 34. One suitable analog-to-digital converter is manufactured by Biomation, Inc., of Palo Alto, Calif., and has a model number 802. The output of the analog-to-digital convertor is fed into a conventional digital memory 36 which includes a ring counter for storing the digital information. As information comes into the digital memory, it is shifted around the ring counter and out of the digital memory on output lead 38.

The digital signals appearing on output lead 38 are, in turn, fed to a digital-to-analog convertor 40 which converts the digital information back to an analog signal that is fed to the recorder 22 for recording. Normally, the analog-to-digital convertor 30 is converting all signals being fed thereto into digital form. However, it is desirable that the analog-to-digital convertor be turned off after a predetermined time after the lightning strike so that the digital information stored in the memory 36 representing the wave shape of the current flowing through the mast can be fed thereout and recorded onto the recorder 22.

One particular method of triggering the analog-to-digital convertor 34 off is by utilizing the signal induced in the coil 24 by the change of flux. This signal is detected by a magnetic core 42 and fed directly into a trigger input 44 of the digital memory. The analog-to-digital convertor is turned off after a predetermined period of time has elapsed. This time is determined from previous tests to be sufficient to completely convert the voltage produced by the current flowing in the mast 10. It is desirable to cut off the analog-to-digital convertor 30 after the voltage from the lightning strike has been processed by the analog-to-digital convertor and stored in the digital memory so as to allow sufficient time for the recorder to record the signals. Both the analog-to-digital convertor and digital memory automatically turned on after sufficient time has lapsed to permit the recorder to record the information contained in the digital memory 36.

A reference voltage circuit is constructed similar to the first circuit and includes a toroidal coil 46 which is placed closely adjacent the mast 10 but not so close that it will receive induced voltages from the flux produced by the current flowing through the mast. The coil 46 is coupled by a shielded cable 48 to an integrator 50. The output of the integrator 50 is fed to a peak voltage detector 52. The output of the peak voltage detector 52 is fed to the recorder 22 providing a reference voltage.

Since the coil 46 is not carried on the mast 10, the only voltages produced in the reference voltage circuit comes from induced voltages received in the shielded cable 48 and other components of the circuit. By comparing the voltages produced by the first peak current protection circuit and the current wave shaped circuit with the voltage produced by the reference voltage circuit the characteristics of the currents produced in the mast can be best determined.

In order to insure that the various meters, digital storage devices, etc. included in the circuit of the figure have an uninterrupted power supply, an auxiliary power supply is utilized. The auxiliary power supply includes conventional AC source of power 54 which is coupled to an AC to DC convertor 56 which converts the voltage to DC. The output of the AC to DC convertor 56 is fed to a bank of batteries 58 for maintaining the batteries charged at all times. The output of the bank of batteries 58 is fed through a DC to AC convertor 60 for converting the voltage back to AC. This AC voltage is supplied to the various components such as the peak voltage detectors, the integrators, the digital memory system, the digital-to analog convertor and recorder for operating the apparatus. If for some reason, the AC power supply 54 were interrupted, the DC battery 58 would continue supplying power for the system.

While a preferred embodiment of the invention has been described using specific terms, such description is for illustrative purposes only, and it is to be understood that changes and variations may be made without departing from the spirit or scope of the following claims.

What is claimed is:

1. An apparatus for monitoring and analyzing electrical currents produced by lightning strikes comprising:
   a. an electrically conductive mast having currents produced therein responsive to lightning strikes,
   b. a first circuit means coupled to said mast for generating a voltage proportional to a peak current generated in said mast by each lightning strike,
   c. said first circuit means including:
      i. a first coil encircling said mast for sensing the flux change produced by said current flowing through said mast and generating a voltage responsive thereto,
      ii. an integrator coupled to said first coil for generating an integrated voltage proportional to said flux change sensed by said first coil,
      iii. a peak voltage detector coupled to said integrator for generating a voltage having an amplitude proportional to the peak of said integrated voltage,
   d. a second circuit means coupled to said mast for generating a digital signal representative of the wave shape of said current generated in said mast by each lightning strike, e. said second circuit means including:
   i. a second coil encircling said mast for sensing the flux change produced by said current flowing through said mast caused by a lightning strike and generating a voltage responsive thereto,
   ii. a second integrator coupled to said second coil for generating an integrated voltage directly proportional to the amplitude of said current flowing in said lightning mast,
   iii. an analog to digital convertor coupled to said second integrator for sampling said integrated voltage at a predetermined rate and generating digital signals corresponding to said integrated voltage, and f. means for recording said voltage generated by said first circuit and said digital signals produced by said second circuit for producing a record representing the wave shape of said current produced in said mast by said lightning strike and the peak current produced.

2. The apparatus as set forth in claim 2 wherein said second circuit includes:
   a. a magnetic core provided for generating a triggering signal responsive to said second coil sensing a flux change in said mast for triggering said analog-to-digital convertor off after a predetermined period of time,
   b. a digital memory coupled to an output of said analog to digital convertor for storing said digital signal from said analog to digital convertor, and
   c. said means for recording includes a strip recorder for recording said signals.

3. The apparatus as set forth in claim 1 further comprising:
   a. shielded cables connecting said first and second coils to said first and second integrators respectively,
   b. a reference voltage circuit,
   c. said reference voltage circuit including:
      i. a third coil carried closely adjacent said mast,
      ii. a third integrator,
      iii. a shielded cable connecting said third coil to said third integrator, and
      iv. a peak voltage detector coupled to said third integrator for generating a reference voltage corresponding to the induced voltage generated in said shielded cable responsive to a lightning strike.

4. The apparatus as set forth in claim 1 further comprising:
   a. an auxiliary self sustaining power supply coupled to said integrators, peak voltage detectors, analog-to-digital convertor and said means for recording.

* * * * *